United States Patent
Sakaguchi et al.

(10) Patent No.: US 8,045,963 B2
(45) Date of Patent: Oct. 25, 2011

(54) COMMUNICATION MESSAGE STORING AND DELIVERING DEVICE, MOBILE COMMUNICATION TERMINAL DEVICE, AND COMMUNICATION MESSAGE STORING AND DELIVERING METHOD

(75) Inventors: Takuji Sakaguchi, Yokohama (JP); Aya Hokamura, Yokohama (JP); Masami Yabusaki, Kashiwa (JP); Motoshi Tamura, Zushi (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 494 days.

(21) Appl. No.: 12/333,783

(22) Filed: Dec. 12, 2008

(65) Prior Publication Data

US 2009/0156174 A1 Jun. 18, 2009

(30) Foreign Application Priority Data

Dec. 14, 2007 (JP) .................... 2007-323211

(51) Int. Cl.
*H04M 1/663* (2006.01)
(52) U.S. Cl. ............... 455/412.2; 455/412.1; 455/414.1; 455/466; 455/432.3
(58) Field of Classification Search ............... 455/412.2, 455/412.1, 414.1, 466, 432.3
See application file for complete search history.

(56) References Cited

U.S. PATENT DOCUMENTS

| | | |
|---|---|---|
| 6,950,502 B1 | 9/2005 | Jenkins |
| 2005/0064883 A1 | 3/2005 | Heck et al. |
| 2005/0245239 A1* | 11/2005 | Haumont et al. ............ 455/413 |
| 2006/0063541 A1 | 3/2006 | Ryu |
| 2006/0122824 A1 | 6/2006 | Fujiwara |
| 2006/0234732 A1 | 10/2006 | Kim |
| 2007/0165790 A1 | 7/2007 | Taori |

FOREIGN PATENT DOCUMENTS

| | | |
|---|---|---|
| JP | 2001-204078 A | 7/2001 |
| JP | 2005-102220 A | 4/2005 |
| JP | 2006-270963 A | 10/2006 |
| JP | 2007-243469 A | 9/2007 |
| JP | 2006-166013 A | 6/2008 |
| KR | 10-2006-035342 A | 4/2006 |
| WO | WO 2004/054220 A1 | 6/2004 |

OTHER PUBLICATIONS

Korean Office Action w/Translation, dated Sep. 30, 2010, 5 pages.
English Translation of Chinese Office Action, dated Mar. 9, 2011, 11 pages.

* cited by examiner

*Primary Examiner* — Nghi Ly
(74) *Attorney, Agent, or Firm* — Crowell & Moring LLP

(57) ABSTRACT

Irrespective of the current situation of a recipient, a message storing service can be actively used by an originator's will, and the recipient can know without a delay that a message addressed to the recipient has been stored. A service for message originator can be specified so that even if a mobile communication terminal device on a recipient side is in a state where it can immediately perform communication when a message is transmitted from a mobile communication terminal device on an originator side, the message is temporarily stored in a message storing box of a telephone answering service subscribed to by a subscriber A as the originator of the message, and the message is delivered to the mobile communication terminal device on the recipient side at timing intended by the originator A.

15 Claims, 7 Drawing Sheets

F I G. 4

| USER ID | GROUP ID | SERVICE ACTIVATION STATUS | CURRENTLY STORED MESSAGE | REGISTRATION DATE AND TIME | MESSAGE STORED LOCATION | DELIVERY DATE AND TIME | DELIVERY TARGET |
|---|---|---|---|---|---|---|---|
| 090-xxxx-xxx1 | 090-xxxx-nnn1 | AVAILABLE | MESSAGE NO. 1 | 07/10/30 20:30 | ./userID/AV/aaa.3gp | 07/11/30 23:30 | 090-yyyy-yyyy |
| ⋮ | ⋮ | | ⋮ | | | ⋮ | |

FIG. 6

| ORIGINATOR USER ID | GROUP ID | ACCESS-ENABLED USER ID | AUTHORITY TO READ | AUTHORITY TO EDIT | AUTHORITY TO DELETE |
|---|---|---|---|---|---|
| 090-xxxx-xxxx | 001 | 090-yyyy-xxxx | ENABLED | DISABLED | DISABLED |
| | ... | ... | | | |
| ... | | | | | |

COMMUNICATION MESSAGE STORING AND DELIVERING DEVICE, MOBILE COMMUNICATION TERMINAL DEVICE, AND COMMUNICATION MESSAGE STORING AND DELIVERING METHOD

BACKGROUND OF THE INVENTION

1. Field of the Invention

The present invention relates to a communication message storing and delivering device, a mobile communication terminal device, and communication message storing and delivering method, a communication message such as an audio and video message.

As used herein, "delivery" not only includes sending a message stored by a communication message storing and delivering device therein to a mobile communication terminal device, but also includes acquiring a message by a mobile communication terminal device accessing a communication message storing and delivering device.

2. Description of the Related Art

In conventional message services of audio communication using a mobile communication terminal device such as a cellular phone and audio-visual communication (video phone), there is a widespread service in which, when a recipient is in a state of being unable to make a response because the location of a recipient is out of service or because of a user setting, power exhaustion, or the like, a message to the recipient is temporarily stored in a predetermined storing device by telephone answering service, and the message is provided to the mobile communication terminal device when the mobile communication terminal device returns to a state of being able to make a response.

However, in this typical telephone answering service, if the telephone answering service is not subscribed to by a recipient, a message is not stored as described above. An originator needs to originate a call again. Therefore, the originator is unsatisfied with it as a user.

To solve such originator's dissatisfaction during use of the service, a technique has already been proposed in which, even if telephone answering service is not subscribed to by the recipient, a message can be stored when the recipient is in a state where it cannot respond.

For example, according to the disclosure of JP 2007-243469 A, a history of calling for an audio message from an audio message delivering device is stored in a recipient's terminal, and the recipient can call the audio message delivering device and requests the audio message therefrom to receive it at an appropriate time after the calling.

Thereby, the audio message can be transmitted to the recipient at a time convenient for the opposite party even if the recipient does not subscribe to telephone answering service or the telephone answering function of its telephone set is turned off.

In addition, according to the disclosure of JP 2001-204078 A, even if telephone answering service is not subscribed to by a recipient, a message is recorded using the telephone answering service on an originator, and the recipient is notified through an e-mail that the message has been recorded, so that the recipient can listen to the recording of the message without a delay. Therefore, the convenience of the telephone answering service is further improved.

Further, JP 2006-166013 A discloses that a plurality of recipients are specified by a delivery destination specifying section of a mobile switching center to perform broadcasting to them, and audio data is provided at a date and time specified by a date and time specifying section of the mobile switching center.

In the proposals of the above JP 2007-243469 A and JP 2001-204078 A, the convenience of the telephone answering service is enjoyed at the originator's cost, even if the telephone answering service is not subscribed to by the recipient, and it is assumed that when the recipient can respond immediately, a transmitted message is delivered to the recipient without going through an additional storing process or the like.

Although JP 2006-166013 A discloses broadcasting to a plurality of recipients and delivery at a specified date and time, there is no method so that a recipient (expected recipient) can know that a message to the recipient has been stored at an early stage, so the message is delivered to the recipient after its non-responding state is cancelled.

Therefore, the inventors of the present invention discovered that any of the above JP 2007-243469 A, JP 2001-204078 A and JP 2006-166013 A does not disclose a method for optionally enabling a message storing service to be used on originator's will and a method for a recipient to know without delay that a message addressed to the recipient has been stored, even if the telephone answering service is not subscribed to by the recipient and whether or not the recipient can respond at a current situation.

SUMMARY OF THE INVENTION

The present invention has been made in view of the above described circumstances, and has an object of the present invention to provide a communication message storing and delivering device, a mobile communication terminal device, and a communication message storing and delivering method in which, irrespective of the current situation of a recipient, a message storing service can be actively used on originator's will, and the recipient can know without a delay that a message addressed to the recipient has been stored.

To solve the above described problems, the present invention provides the following devices and methods.

According to one aspect of the present invention, there is provided a communication message storing and delivering device including: information receiving means for receiving a message that is transmitted from a mobile communication terminal device, delivery destination specifying information which specifies a delivery destination of the message, and used service specifying information which specifies a way of handling the message; used service identifying means for identifying whether or not the used service specifying information received by the information receiving means includes a message storing service request which requests to perform a message storing service that stores the message before the message is acquired by the delivery destination specified by the delivery destination specifying information, and identifying whether or not information of the message storing service request is compliant with a normal service used by a subscriber of the mobile communication terminal device which transmits the message; message information storing means for storing the message, the delivery destination specifying information, and the used service specifying information when the used service identifying means identifies that the received used service specifying information includes the message storing service request information and the message storing service request information is compliant with the normal used service; notification means for notifying the relevant delivery destination that the message has been stored, based on the delivery destination specifying information stored in the message information storing means; and information supplying means for enabling the delivery destination which receives the notification from the notification means to acquire the message stored in the message information storing means.

In the above configuration, the information receiving means receives a message, delivery destination specifying information which specifies a delivery destination of the message, and used service specifying information which specifies a way of handling the message that are transmitted from a mobile communication terminal device.

When the used service identifying means identifies that the received used service specifying information includes message storing service request information and the message storing service request information is compliant with the normal used service, the message information storing means stores the message, delivery destination specifying information, and used service specifying information.

The notification means notifies the relevant delivery destination that the message is stored, based on the delivery destination specifying information stored in the message information storing means.

The information supplying means enables the delivery destination to which the notification means gives the notification to acquire the message stored in the message information storing means.

Therefore, if the used service identifying means identifies that the received used service specifying information includes message storing service request information and the message storing service request information is compliant with the normal used service, the message transmitted from the mobile communication terminal device is stored in the message information storing means irrespective of the state of the recipient, and can be provided afterward to be acquired by the relevant delivery destination.

Further, particularly in the above described communication message storing and delivering device, the information receiving means may receive the message, the delivery destination specifying information, and the used service specifying information at different timings.

In the above configuration, assuming, for example, a time point when the message is received and stored to be a reference time point, the delivery destination specifying information can be supplied from the originator's mobile communication terminal device at any one of a time point before the reference time point, a time point synchronous therewith, and a time point thereafter.

Further, particularly in the communication message storing and delivering device, the information supplying means may, when a request to acquire the message stored in the message information storing means is received from the delivery destination specified by the delivery destination specifying information without waiting for the notification that the message has been stored from the notification means, supply the message to the delivery destination which has made the request.

In the above configuration, when a request to acquire a message actively is transmitted from a delivery destination without waiting for the notification that the message has been stored from the notification means and the request is received, the information supplying means supplies the message to the delivery destination which has made the request as long as the delivery destination is a delivery destination specified by the delivery destination specifying information.

Further, particularly in the communication message storing and delivering device, the information supplying means may be configured to stream the message stored in the message information storing means to the relevant delivery destination.

In the communication message storing and delivering device, for example, music, video, or the like corresponding to the message can be streamed to be delivered.

Further, particularly in the communication message storing and delivering device, the message information storing means may be connected to a public message storing area which is accessible from a device other than the delivery destination defined by the delivery destination specifying information, and the information supplying means may supply the message from the public message storing area to the relevant device.

In the above configuration, a message stored in the public message storing area is allowed to be accessed from not only a specified limited recipient but also from many various terminals such that the message can be provided to and used by them.

In addition, particularly the communication message storing and delivering device may further include message editing restricting means for allowing editing processing of the message stored in the message information storing means in a form restricted for each delivery destination specified by the delivery destination specifying information.

In the above configuration, editing processing such as deletion, revision of a content or the like is allowed with respect to a stored message within authority restricted for each delivery destination (for each recipient), so that a message delivery network can be built which not only enables a function to simply deliver a uniform message from an originator to a recipient but also allows a participant to process and manage a message.

Further, particularly in the communication message storing and delivering device, the message editing restricting means may be configured to allow editing processing of the stored message in a form restricted for each group to which the delivery destination specified by the delivery destination specifying information belongs.

In the above configuration, editing can be allowed to be applied to a stored message within authority in a form restricted for each group to which a delivery destination specified by the delivery destination specifying information belongs, instead of editing being allowed to be applied to the stored message within authority restricted for each delivery destination (for each recipient) as described above, so that disciplined operation can be achieved in a manner that many subscribers are classified into a plurality of classes.

Further, particularly in the communication message storing and delivering device, the used service identifying means may be configured to read notification timing information if the used service specifying information includes the notification timing information which indicates timing to notify the delivery destination specified by the delivery destination specifying information that the message has been stored, and the notification means may be configured to notify the delivery destination that the message has been stored at a timing to correspond to a result of reading the notification timing information by the used service identifying means.

In the above configuration, a message desired to be delivered to a recipient at appropriate timing such as a predetermined congratulatory message can be delivered to the recipient at the desired timing.

Further, particularly in the communication message storing and delivering device, the information receiving means may acquire subscriber information from a subscriber information management device in a mobile communication network, and the notification means may notify the delivery destination that the message has been stored when it is recognized from the subscribe information of the delivery destination acquired by the information receiving means that the delivery destination is in a communication-enabled state.

In the above configuration, when it is recognized that a relevant delivery destination is in a communication-enabled state from subscriber information at a present time acquired from a subscriber information management device such as an HLR, the delivery destination can be surely notified that a message has been stored.

Further, particularly in the communication message storing and delivering device, the notification means may provide the notification to the delivery destination of the message specified by the delivery destination specifying information, using SMS (Short Message Service).

Further, particularly in the communication message storing and delivering device, the used service identifying means may be configured to read specification information if the used service specifying information includes the specification information which indicates a specification about a communication capability of the delivery destination specified by the delivery destination specifying information, and the information supplying means may supply the message to the delivery destination to correspond to the read specification information.

According to another aspect of the present invention, there is provided a mobile communication terminal device including: message input means for inputting a message to be transmitted including an audio message; delivery destination specifying operation means for forming delivery destination specifying information which specifies a delivery destination of the message inputted from the message input means, according to an external operation; used service specifying operation means for forming used service specifying information which specifies a way of handling the message inputted from the message input means, according to external operation; signal transmission means for sending, to a communication message storing and delivering device corresponding to the mobile communication terminal device itself, the message inputted from the message input means, the delivery destination specifying information formed according to the operation on the delivery destination specifying operation means, and the used service specifying information formed according to the operation on the used service specifying operation means; receiving means for receiving a notification from notification means which notifies the relevant delivery destination that the message has been stored, based on the delivery destination specifying information stored in message information storing means in the communication message storing and delivering device; and stored message acquiring means for acquiring the message stored in the message information storing means in the communication message storing and delivering device in response to the notification received by the receiving means.

The mobile communication terminal device in this configuration receives as input a message to be transmitted including an audio message from the message input means, forms delivery destination specifying information which specifies a delivery destination of the message inputted from the message input means, according to external operation on the delivery destination specifying operation means, and forms used service specifying information which specifies a way of handling the message inputted from the message input means, according to external operation on the used service specifying operation means.

Then, by the signal transmission means, the mobile communication terminal device sends, to a communication message storing and delivering device corresponding to the own device, the message inputted from the message input means, the delivery destination specifying information formed according to the operation on the delivery destination specifying operation means, and the used service specifying information formed according to the operation on the used service specifying operation means.

Further, by the receiving means, the mobile communication terminal device receives a notification from notification means which notifies the relevant delivery destination that the message has been stored, based on the delivery destination specifying information stored in message information storing means in the communication message storing and delivering device.

Then, by the stored message acquiring means, the mobile communication terminal device acquires the message stored in the message information storing means in the communication message storing and delivering device in response to the notification received by the receiving means.

Therefore, in this mobile communication terminal device, irrespective of the state of a recipient of a message (a mobile communication terminal device of an intended recipient), used service specifying information formed by operation on the used service specifying operation means is sent from the signal transmission means to the communication message storing and delivering device, so that the message can be stored in the message information storing means in the communication message storing and delivering device.

Furthermore, a message transmitted from a target mobile communication terminal device and stored in the message information storing means in the communication message storing and delivering device can be acquired by the stored message acquiring means.

Particularly, in the above described mobile communication terminal device, the used service specifying operation means may be configured so as to include an operation section for forming group identification information which indicates a group, to which the mobile communication terminal device belongs, among groups defined corresponding to a form of authority to perform editing processing on the message stored in the message storing means in the communication message storing and delivering device.

According to the mobile communication terminal device as described above, authority to perform editing processing on a message stored in the message storing means in the communication message storing and delivering device is held depending on a class of a group which is set by the operation section as a group to which the mobile communication terminal device itself belongs, so that disciplined operation can be achieved in a manner that many subscribers are classified into a plurality of classes.

Further, particularly in the above described mobile communication terminal device, the used service specifying operation means may be configured to include an operation section for forming notification timing information which specifies timing when the notification means in the communication message storing and delivering device notifies the delivery destination specified by the delivery destination specifying information that the message has been stored.

According to the mobile communication terminal device in this configuration, a message desired to be delivered to a recipient at appropriate timing such as a predetermined congratulatory message can be delivered to the recipient at the desired timing.

According to yet another aspect of the present invention, there is provided a communication message storing and delivering method including: receiving a message that is transmitted from a mobile communication terminal device, delivery destination specifying information which specifies a delivery destination of the message, and used service specifying information which specifies a way of handling the message; identifying whether or not the received used service specifying information includes a message storing service request which requests to perform a message storing service that stores the message before the message is acquired by the delivery destination specified by the delivery destination specifying information, as well as identifying whether or not information of the message storing service request is compliant with a normal service used by a subscriber of the mobile communication terminal device which transmits the message; storing the message, the delivery destination specifying information, and the used service specifying information when results of the identification are both positive; notifying the relevant delivery destination that the message has been stored based on the stored delivery destination specifying information; and enabling the delivery destination which receives the notification to acquire the stored message.

In the above communication message storing and delivering method as described above, irrespective of the current situation of a recipient, a message storing service can be actively used on originator's will, and the recipient can know without delay that a message addressed to the recipient has been stored.

According to the present invention, a communication message storing and delivering device, a mobile communication terminal device, and a communication message storing and delivering method are implemented in which irrespective of the current situation of a recipient, a message storing service can be actively used on originator's will, and the recipient can know without delay that a message addressed to the recipient has been stored.

BRIEF DESCRIPTION OF THE DRAWINGS

FIG. 4 illustrates a diagram showing a data structure of an originator's storing and delivering service profile prepared in a service profile management section of FIG. 2;

FIG. 6 illustrates a diagram showing an access list which defines authority to edit an stored message that is given to each originator or each group.

DETAILED DESCRIPTION OF THE PREFERRED EMBODIMENTS

Hereinafter, the present invention will be described in detail with reference to the drawings to clarify the present invention.
(Overview of a Mobile Communication System Including a Device of the Present Invention)

Figure 1:
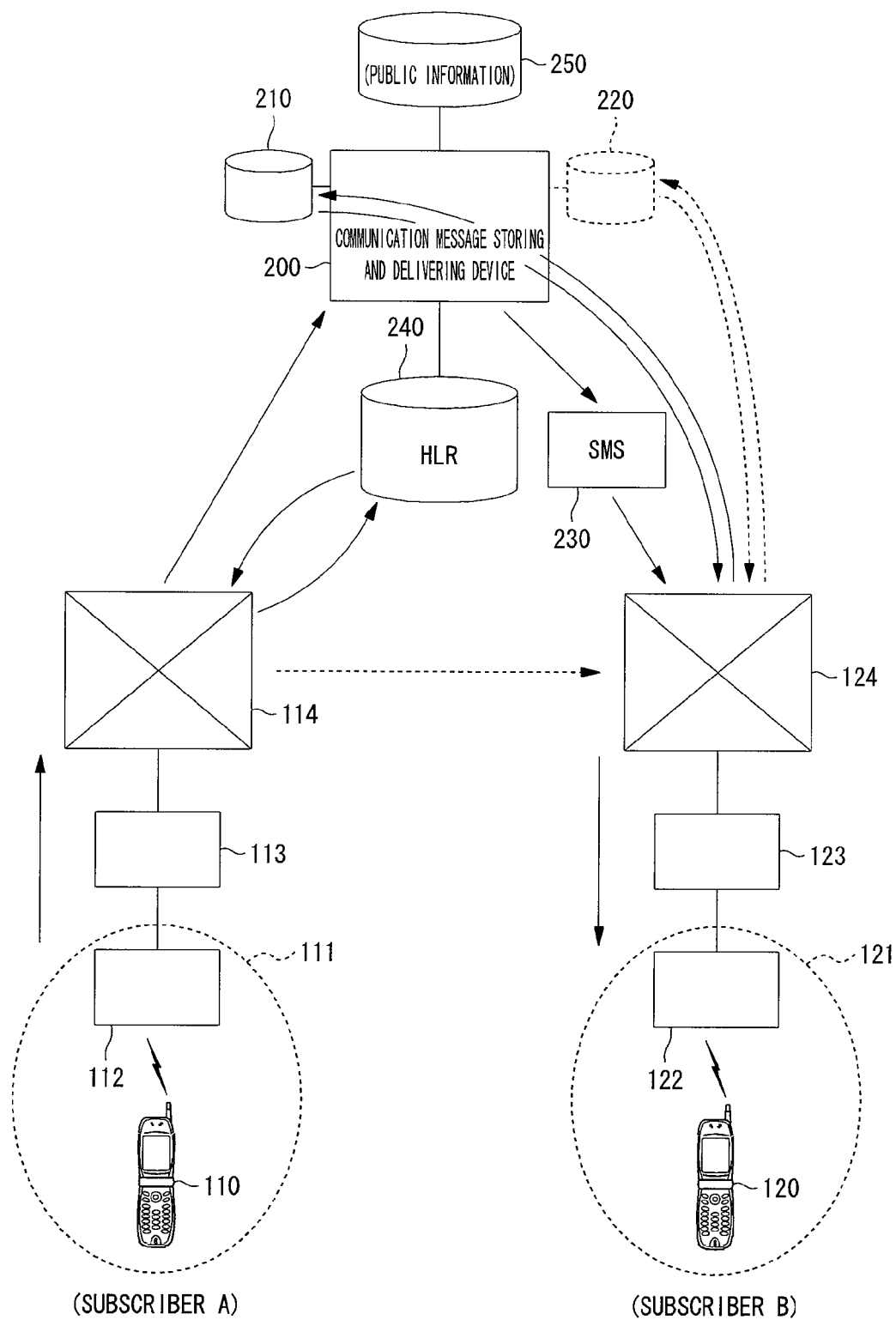
FIG. 1 illustrates a conceptual diagram of a configuration of a mobile communication system including a communication message storing and delivering device and a mobile communication terminal device as according to one embodiment of the present invention.

FIG. 1 illustrates a conceptual diagram of a configuration of a mobile communication system including a communication message storing and delivering device and a mobile communication terminal device according to one aspect of the present invention. In FIG. 1, a message transmitted from a mobile communication terminal device 110 (on originator side in the figure) according to one aspect of the present invention is passed through a base transceiver station 112 and a base transceiver station controller 113 to a mobile switching center 114 as in this kind of well-known system.

Similarly, a mobile communication terminal device 120 on recipient's side is connected through a base transceiver station 122 and a base transceiver station controller 123 to a mobile switching center 124.

In this figure, the mobile communication terminal device 110 is located in a cell 111 of the base transceiver station 112, and the mobile communication terminal device 120 is located in a cell 121 of the base transceiver station 122.

In a normal audio communication where telephone answering service is not used, the mobile switching center 114 is connected through or not through a higher-level system such as a gateway (not shown) to the mobile switching center 124, and a message transmitted from the mobile communication terminal device 110 is delivered to the mobile communication terminal device 120.

To implement a message storing and delivering service for the mobile communication terminal device 110, a communication message storing and delivering device 200 according to one aspect of the present invention is provided as shown in FIG. 1.

A message storing box 210 serving as a storage function section is connected to or set up in the communication message storing and delivering device 200, and is used for storing a message to be subjected to the telephone answering service for a subscriber A of the mobile communication terminal device 110.

In a case where the telephone answering service functions when the mobile communication terminal device 110 is on a recipient side, a message sent to the mobile communication terminal device 110 as the recipient-side device is stored in the message storing box 210, and when the mobile communication terminal device 110 returns to a communication-enabled state at a later point of time, the message is provided to the recipient.

In conventional telephone answering services, to store a message to be subjected to the telephone answering service for a subscriber B of the mobile communication terminal device 120, a message storing box 220 is connected to or set up in the communication message storing and delivering device 200 as shown by a dashed line in the same manner as described above.

In the conventional telephone answering services, the message to be subjected to the telephone answering service for the subscriber B of the mobile communication terminal device 120 is stored in the message storing box 220, and when the mobile communication terminal device 120 returns to a communication-enabled state at a later point of time, the message is provided to the recipient (as schematically illustrated by dashed arrows).

Thus, in the conventional systems, the message storing box 220 is essentially prepared when a message to the mobile communication terminal device 120 of the subscriber B is temporarily stored by the function of the telephone answering service.

On the other hand, according to one aspect of the present invention, a message to the mobile communication terminal device 120 of the subscriber B is also stored in the message storing box 210 of the subscriber A subscribing to the telephone answering service under control of the message storing and delivering device 200.

When a message to the mobile communication terminal device 120 of the subscriber B is stored in the message storing box 210 of the subscriber A as described above, the message storing and delivering device 200 notifies the mobile communication terminal device 120 that the relevant message has been stored, using a short message service provided by an SMS (Short Message Service) device 230.

The mobile communication terminal device 120 which has received this notification acquires the message stored therein, for example, by accessing the message storing box 210 of the subscriber A (as schematically illustrated by solid arrows).

An HLR 240 (Home Location Register) 240 serving as a subscriber information management device is provided in this kind of well known mobile communication system.

The communication message storing and delivering device 200 recognizes the current state of the mobile communication terminal device (120) on the recipient side by referring to subscriber information stored in the HLR 240, and when the mobile communication terminal device (120) on the recipient side is in a communication-enabled state, notifies that the relevant message has been stored.

Additionally, in the above embodiments, there is provided a public message storing box 250 serving as a public message storing area allowed to be accessed from not only a specified limited message delivery destination but also from mobile communication terminal devices in a wider range.

Although FIG. 1 illustrates the message storing box 210 of the subscriber A, the message storing box 220 of the subscriber B (not necessarily required in the present invention), and the public message storing box 250 are connected to the communication message storing and delivering device 200, these boxes may be provided within the communication message storing and delivering device 200.

Figure 2:
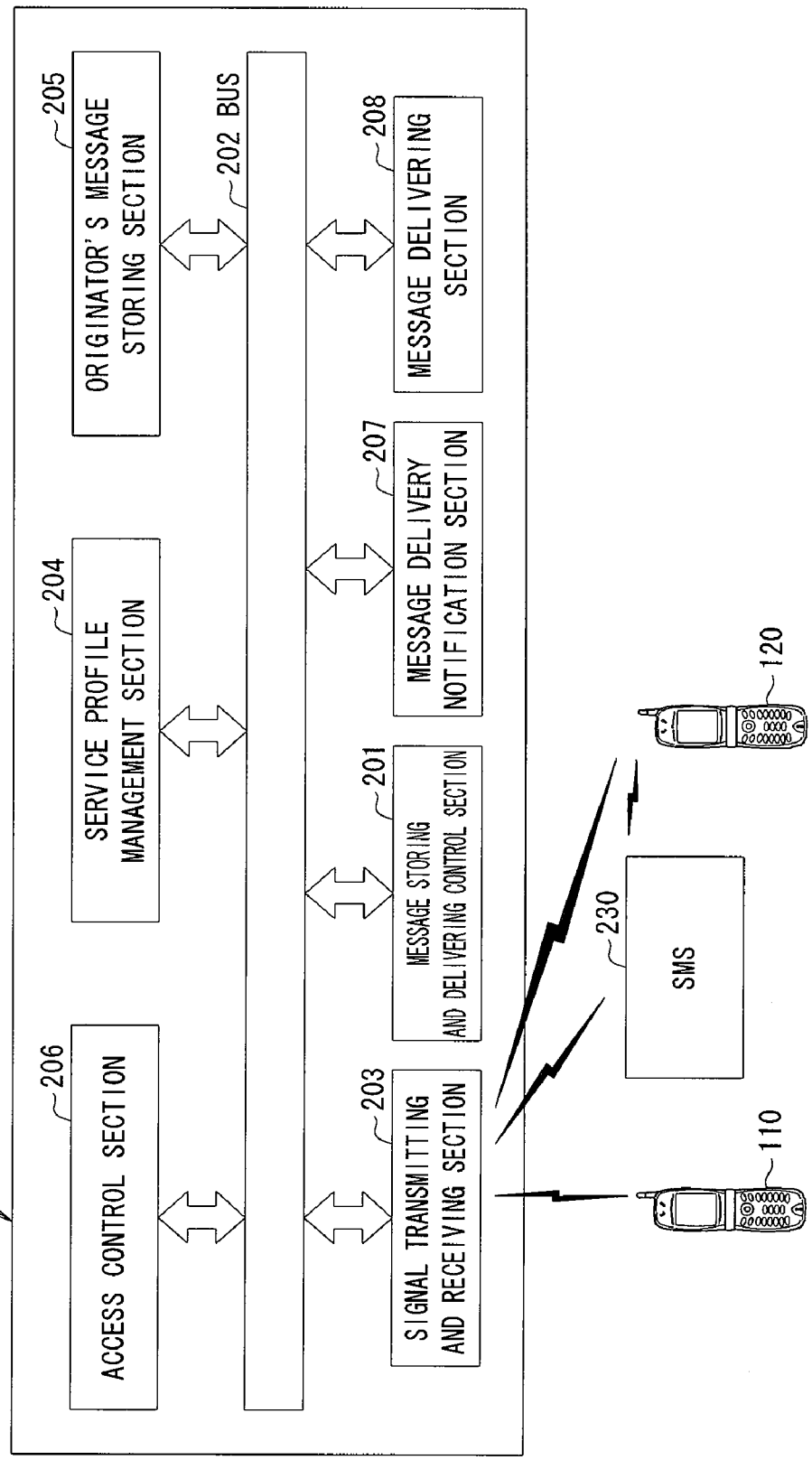
FIG. 2 illustrates a functional block diagram of a configuration of the communication message storing and delivering device in FIG. 1.

FIG. 2 illustrates a functional block diagram of a configuration of the communication message storing and delivering device 200 in FIG. 1.

In the communication message storing and delivering device 200, a message storing and delivering control section 201 which functions like the so-called system controller to generally control the communication message storing and delivering device 200 is connected through a bus 202 to various function sections described below, so that the communication message storing and delivering device 200 is configured to execute a message storing and delivering function and other functions.

Specifically, the message storing and delivering control section 201 is connected through the bus 202 to a signal transmitting and receiving section 203, a service profile management section 204, an originator's message storing section 205, an access control section 206, a message delivering notification section 207, a message delivering section 208, and the like.

The signal transmitting and receiving section 203 receives a message, delivery destination specifying information which specifies a delivery destination of the message, and used service specifying information which specifies a way of handling the message that are transmitted from the mobile communication terminal device 100 (FIG. 1).

The service profile management section 204 holds information which indicates a service contract status and a service use status of an originator as described later with reference to FIG. 4, and supplies the held information as necessary.

The originator's message storing section 205 stores data to be delivered such as audio and video message and media data which is transmitted from the mobile communication terminal device 110 by the originator (A in FIG. 1), in a storage function section which is provided in the originator's message storing section itself or an external storage function section connected in a usable form thereto (for example, the message storing box 210 in FIG. 1).

The access control section 206 allows a message (data to be delivered) stored in the originator's message storing section 205 to be accessed only from a specified mobile communication terminal device.

The message delivery notification section 207 notifies a relevant delivery destination (the mobile communication terminal device 120 of the recipient) that a message has been stored when the message has been stored in the originator's message storing section 205.

In the above embodiments, this notification is transmitted through the above described signal transmitting and receiving section 203 by the SMS using the SMS device 230 as described above with reference to FIG. 1.

The message delivering section 208 delivers the message stored in the originator's message storing section 205 to the relevant delivery destination (the mobile communication terminal device 120 of the recipient) at a predetermined timing in response to a request from the relevant delivery destination (recipient) or under control of the message storing and delivering control section 201 and the access control section 206.

In the above embodiments, this delivery is performed through the above described signal transmitting and receiving section 203.

In this manner, in the communication message storing and delivering device 200 of the present invention, the above-mentioned signal transmitting and receiving section 203 and the like, which operate under control of the message storing and delivering control section 201, enable the information receiving means for receiving a message (e.g., a media message), delivery destination specifying information which specifies a delivery destination of the message, and used service specifying information which specifies a way of handling the message that are transmitted from the mobile communication terminal device 100.

Further, the above mentioned message storing and delivering control section 201 and the like which reference information held in the service profile management section 204 as needed enable the used service identifying means for identifying whether or not the used service specifying information received by the information receiving means (203, 201) includes a message storage service request which requests a message storage service to store the message before the message is acquired by the delivery destination (e.g., the mobile communication terminal device 120) specified by the delivery destination specifying information, and identifying whether or not information of the message storage service request is compliant with a normal service used by a subscriber of the mobile communication terminal device which transmits the message.

Further, the above mentioned originator's message storing section 205 and the like which operate under control of the message storing and delivering control section 201 realize the message information storing means for storing the message, delivery destination specifying information, and used service specifying information when the used service identifying means (201, 204) identifies that the received used service specifying information includes the message storage service request information and the message storing service request information is compliant with the normal used service.

Further, the above mentioned message delivery notification section 207, the signal transmitting and receiving section 203, and the like which operate under control of the message storing and delivering control section 201 enable the notification means for notifying the relevant delivery destination that the message has been stored, based on the delivery destination specifying information stored in the message information storing means (205, 201).

Further, the above mentioned message delivering section 208 and the like which operate under control of the message storing and delivering control section 201 and the access control section 206 enable the information supplying means for enabling the delivery destination (120) which receives the notification from the notification means (207, 203, 201) to acquire the message stored in the message information storing means.

The information receiving means (203, 201) may be configured to be capable of receiving the message, the delivery destination specifying information, and the used service specifying information at different timings.

Therefore, if the used service identifying means (201, 204) identifies that the received used service specifying information includes the message storing service request information and the message storing service request information is compliant with the normal used service, the message transmitted from the mobile communication terminal device (110) of an originator is stored in the message information storing means (205, 201) irrespective of the state of a recipient (its mobile communication terminal device 120), and can be provided to be acquired by the relevant delivery destination (the mobile communication terminal device 120) when it returns to a communication-enabled state or the like at a later time point.

On the other hand, the information supplying means may be configured in a variety of forms. For example, it may be configured to supply the message to the delivery destination (the mobile communication terminal device 120) which has made the request, when a request to acquire a message stored in the message information storing means (205, 201) is received from the delivery destination (mobile communication terminal device 120) specified by the delivery destination specifying information without waiting for the notification that the message has been stored from the notification means (207, 203, 201).

In the communication message storing and delivering device 200 in this configuration, the delivery destination (the mobile communication terminal device 120) may transmit a request to acquire a message actively, even though a notification that the message has been stored is not necessarily received from the notification means (207, 203, 201).

When this request is received by the information receiving means (203, 201), the information supplying means (208, 206, 201) supplies the message to the delivery destination which has made the request as long as the delivery destination (the mobile communication terminal device 120) is identical to that specified by the delivery destination specifying information.

Further, particularly in the communication message storing and delivering device 200, the information supplying means (208, 206, 201) may be configured to stream a message stored in the message information storing means (205, 201) to the relevant delivery destination (the mobile communication terminal device 120).

In the communication message storing and delivering device in this configuration, for example, music, video, or the like corresponding to the message can be streamed to be delivered. Therefore, even a mobile communication terminal device having a relatively small-sized storage capacity can reproduce music, moving image, or the like for a long time.

Further, as previously described with reference to FIG. 1, the message information storing means (205, 201) in the communication message storing and delivering device 200 may be connected to a public message storing area (the public message storing box 250) which can be accessed from a device other than the delivery destination defined by the delivery destination specifying information. The information supplying means (208, 206, 201) is configured to be able to supply the message from the public message storing area 250 to the relevant device.

In the communication message storing and delivering device 200 according to one aspect of the present invention, a message stored in the public message storing area (the public message storing box 250) is allowed to be accessed from not only a specified limited recipient but also many various terminals such that the message can be provided to and used by them.

In addition, particularly the communication message storing and delivering device 200 may be configured to further include message editing restricting means for allowing editing processing of a message stored in the message information storing means (205, 201) in a form restricted for each delivery destination specified by delivery destination specifying information.

The message editing restricting means can be enabled, in FIG. 2 according to one aspect of the present invention, by configuring the access control section 206 to execute a function of restricting a form in which message editing processing is allowed under control of the message storing and delivering control section 201. Types of editing processing and their restrictions will be described later with reference to FIG. 6.

In the communication message storing and delivering device 200 in this configuration, editing processing such as deletion, revision of a content or the like is allowed with respect to a stored message within authority restricted for each delivery destination (for each recipient), so that a message delivery network can be established which not only enables a function to simply deliver a uniform message from an originator to a recipient but also allows a participant who sends and receives a message to process and manage the message.

Further, particularly the message editing restricting means (206, 210) may be configured to allow editing processing of the stored message in a form restricted for each group to which a delivery destination specified by the delivery destination specifying information belongs.

The restriction (allowance) in the above case will also be described later in detail, with reference to FIG. 6.

The communication message storing and delivering device 200 in this configuration allows editing to be applied to an stored message within authority in a form restricted for each group to which a delivery destination (a mobile communication terminal device) specified by the delivery destination specifying information belongs, instead of allowing editing from each mobile communication terminal device to be applied to the stored message within authority restricted for each delivery destination (for each recipient) as described above.

Thereby, disciplined operation can be achieved in a manner that many subscribers are classified into a plurality of classes.

Further, particularly in the communication message storing and delivering device 200, the used service identifying means (201, 204) may be configured to read notification timing information if the used service specifying information includes the notification timing information which indicates timing to notify the delivery destination specified by the delivery destination specifying information that the message has been stored.

In this case, the notification means (207, 203, 201) in the communication message storing and delivering device 200 may be configured to notify the delivery destination that the message has been stored at a timing corresponding to a result of reading the notification timing information by the used service identifying means (201, 204).

In the communication message storing and delivering device 200 in such a configuration, a message desired to be delivered to a recipient at an appropriate timing such as a predetermined congratulatory message is delivered to the recipient at a desired timing.

Further, particularly in the communication message storing and delivering device 200, the information receiving means (203, 201) may be configured to be capable of acquiring subscriber information from a subscriber information management device (the HLR 240 in FIG. 1) in a mobile communication network, and the notification means (207, 203, 201) may be configured to notify the delivery destination that the message has been stored, when it is recognized from subscribe information of the delivery destination acquired by the information receiving means (203, 201) that the delivery destination is in a communication-enabled state.

In the communication message storing and delivering device in this configuration, when it is recognized that a relevant delivery destination is in a communication-enabled state from subscriber information at a present time acquired from the subscriber information management device such as an HLR 240, the delivery destination can be surely notified that a message has been stored.

Further, particularly in the communication message storing and delivering device 200, the notification means (207, 203, 201) may be configured to provide the notification to the delivery destination of the message specified by the delivery destination specifying information, using SMS (short message service). Generally, an efficient communication can be achieved by making full use of the characteristics of SMS as simple communication means.

Further, particularly in the communication message storing and delivering device, the used service identifying means (201, 204) may be configured to read specification information if the used service specifying information includes the specification information which indicates a specification about communication capabilities of a delivery destination specified by the delivery destination specifying information. The information supplying means (203, 201) may be configured to supply a message to the delivery destination in a manner corresponding to the read specification information.

In such a configuration, a message is supplied in a manner appropriate for the capabilities of a mobile communication terminal device so that an efficient communication can be achieved.

(Configuration of a Mobile Communication Terminal Device)

Figure 3:
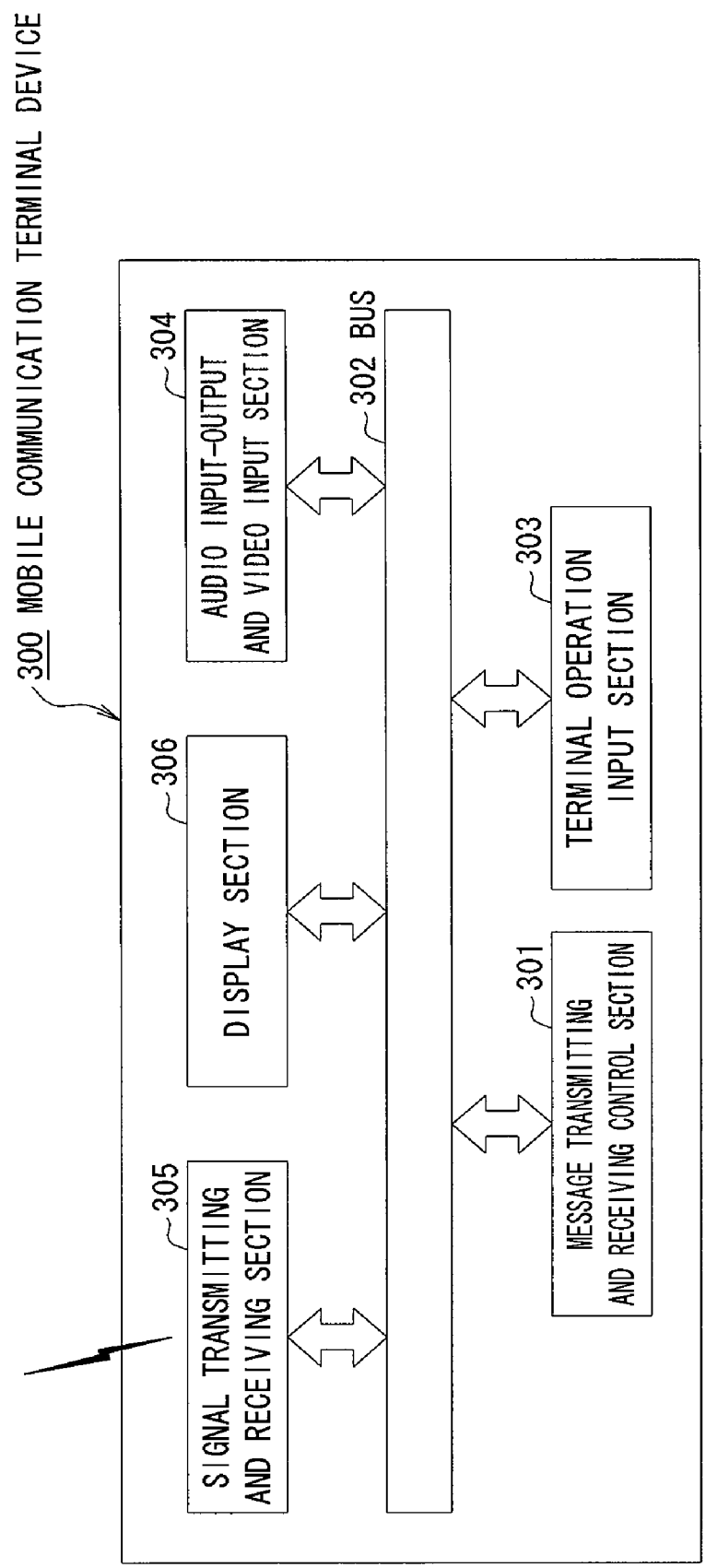
FIG. 3 illustrates a functional block diagram of a configuration of a mobile communication terminal device according to one embodiment of the present invention.

FIG. 3 illustrates a functional block diagram of a configuration of a mobile communication terminal device according to one aspect of the present invention.

Although this mobile communication terminal device corresponds to the mobile communication terminal device 110 (120) in FIG. 1, reference numeral 300 is newly assigned to the mobile communication terminal device in FIG. 3, and a reference numeral in the 300's is applied to each part.

In the mobile communication terminal device 300, a message transmitting and receiving control section 301 which functions as the so-called system controller to generally control each part of the device is connected through a bus 302 to various function sections described below, so that it is configured to execute a message transmitting and receiving function and other functions.

Specifically, the message transmitting and receiving control section 301 is connected through the bus 302 to a terminal operation input section 303, an audio input-output and video input section 304, a signal transmitting and receiving section 305, and a display section 306.

The terminal operation input section 303 is adapted to accept operations, by a user of the mobile communication terminal device 300, for transmitting a message, specifying a type of service intended to be applied, and specifying a transmission destination (recipient) of the message, and is constructed such that, for example, various types of controls are arranged thereon.

The audio input-output and video input section 304 is a sensor including a microphone and a camera for acquiring audio information and image information.

The signal transmitting and receiving section 305 is a component mainly comprised of so-called an RF section for sending a message, information which specifies a type of service intended to be applied to delivery of the message, and information which specifies a transmission destination (recipient) of the message, and receiving information from another mobile communication terminal device.

The display section 306 is composed of liquid crystal and other display elements, and displays character information and video (image) information relative to transmission and reception and various things relative to operation and action.

In this manner, in the mobile communication terminal device 300 according to one aspect of the present invention, the above-mentioned audio input-output and video input section 304 and the like which operate under control of the message transmitting and receiving control section 301 serves as the message input means for inputting a message to be transmitted including an audio message.

Further, the above mentioned terminal operation input section 303 and the like which operate under control of the message transmitting and receiving control section 301 serves as the delivery destination specifying operation means for forming delivery destination specifying information which specifies a delivery destination of a message inputted from the message input means (301, 304), according to an external operation.

Further, the above-mentioned terminal operation input section 303 and the like, which operate under control of the message transmitting and receiving control section 301, serves as the used service specifying operation means. The used service specifying means is provided for forming used service specifying information which specifies a way of handling a message inputted from the message input means (301, 304), according to an external operation.

Further, the above-mentioned signal transmitting and receiving section 305 and the like which operate under control of the message transmitting and receiving control section 301 serves as the signal transmission means for sending, to a communication message storing and delivering device (200) corresponding to the mobile communication terminal device itself, a message inputted from the message input means (301, 304), the delivery destination specifying information formed according to operation on the delivery destination specifying operation means (301, 303), and the used service specifying information formed according to operation on the used service specifying operation means (301, 303).

Further, the above-mentioned signal transmitting and receiving section 305 and the like which operate under control of the message transmitting and receiving control section 301 serves as the receiving means for receiving a notification from the notification means which notifies the relevant delivery destination (the mobile communication terminal device 120) that the message has been stored, based on the delivery destination specifying information stored in the message information storing means in the communication message storing and delivering device (200).

Further, the above mentioned signal transmitting and receiving section 305, the terminal operation input section 303, and the like which operate under control of the message transmitting and receiving control section 301 serves as the stored message acquiring means for acquiring the message stored in the message information storing means in the communication message storing and delivering device (200) in response to the notification received by the receiving means (305, 301).

According to the mobile communication terminal device 300 according to one aspect of the present invention having the above-described configuration, irrespective of the state of a recipient of a message (a mobile communication terminal device of an intended recipient; in FIG. 1, the mobile communication terminal device 120), whether the recipient is in a state of being capable of immediately initiating communication or a state of being incapable of immediately initiating communication due to in the out-of-service area, power-off, or the like, the used service specifying information formed by an operation on the used service specifying operation means (301, 303) is sent from the signal transmission means (301, 305) to the communication message storing and delivering device (200), so that the message can be stored in the message information storing means in the communication message storing and delivering device (200).

Furthermore, a message transmitted from a target mobile communication terminal device (120) and stored in the message information storing means in the communication message storing and delivering device (200) can be acquired by the stored message acquiring means (301, 305).

Further, particularly in the mobile communication terminal device 300, the used service specifying operation means (301, 305) may be configured to include an operation section for forming group identification information which indicates a group to which the mobile communication terminal device itself belongs among groups defined to correspond to a form of authority to perform editing processing on a message stored in the message storing means in the communication message storing and delivering device (200).

This is achievable by arranging specific controls in the terminal operation input section 303 in a manner to adapt to the above-described operations, or assigning controls also having other functions such that the controls can be operated in an operational procedure adapted to the above described operations, or the like.

According to the mobile communication terminal device 300 as described above, the authority to perform editing processing on a message stored in the message storing means in the communication message storing and delivering device (200) is secured depending on a class of a group which is set by the operation section as a group to which the mobile communication terminal device itself belongs, so that the disciplined operation can be achieved in a manner that many subscribers are classified into a plurality of classes.

Further, particularly in the mobile communication terminal device 300, the used service specifying operation means (301, 305) may be configured to include an operation section for forming notification timing information which specifies the timing when the notification means in the communication message storing and delivering device (200) notifies a delivery destination specified by the delivery destination specifying information that the message has been stored.

This operation section can be realized by arranging specific controls in the terminal operation input section 303 in a manner to adapt to the above described operations, or by assigning controls also having other functions such that the controls can be operated in an operational procedure adapted to the above described operations, or the like.

The mobile communication terminal device 300 in such a configuration permits a message that should be delivered to a recipient at an appropriate timing such as a predetermined congratulatory message to be delivered to the recipient at a desired timing.

(Details of the Communication Message Storing and Delivering Device)

Further details of embodiments of the above mentioned communication message storing and delivering device 200 will hereinafter be described with reference to FIGS. 4 to 6.

FIG. 4 illustrates a diagram showing a data structure of an originator's storing and delivering service profile prepared in the service profile management section 204 in the communication message storing and delivering device 200 of FIG. 2.

As previously described, the service profile management section 204 holds information which indicates a service contract status and a service use status of an originator, and supplies the held information as necessary. This held information corresponds to data of an originator's storing and delivering service profile of FIG. 4.

As shown, the originator's storing and delivering service profile includes the following data: "user ID" which represents an originator, "group ID" which represents a group to which the originator belongs as mentioned above, "service activation status" which represents whether or not message storing service is available at a relevant time, "currently stored message" which represents a currently stored message, "registration date and time" which represents a date and time at which the message was stored, "message stored location" which represents a stored area of the message that is assigned with respect to the originator's message storing section 205 in the communication message storing and delivering device 200, "delivery date and time" in a case where a date and time of message delivery is specified, and "delivery target".

The concept of group and specifying of a delivery date and time have previously been described. That is, authority for editing and the like of an stored message is defined depending on a group in reference to the above described originator's storing and delivering service profile information, and a notification that a message has been stored is provided at a specified date and time.

Figure 5:
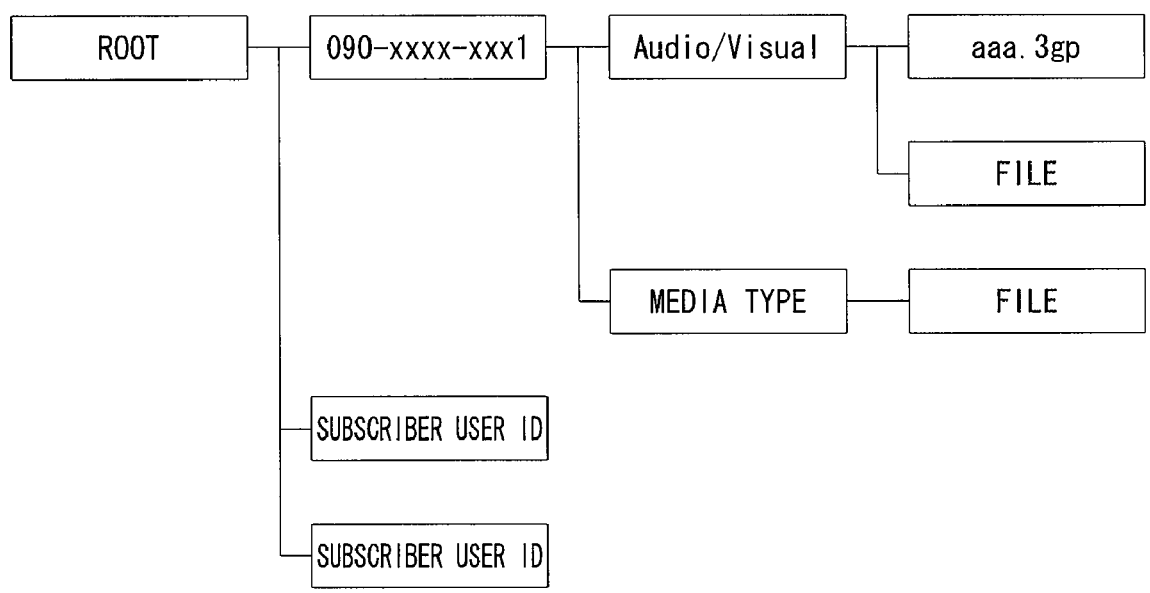
FIG. 5 illustrates a diagram showing a data structure of a message stored in an originator's message storing section or a storage device thereof and the like in the communication message storing and delivering device of FIG. 2.

FIG. 5 illustrates a diagram showing a data structure of a message stored such as in the originator's message storing section 205 or a storage device thereof in the communication message storing and delivering device 200 of FIG. 2.

As shown, data is stored in a hierarchical structure having a certain root. Although this sort of data is allowed to be accessed from a certain one recipient, it may be allowed to be accessed from a plurality of delivery targets in some cases.

FIG. 6 illustrates a diagram showing an access list which defines authority to edit a stored message that is given to each originator or each group. This access list is prepared in the access control section 206 in the communication message storing and delivering device 200 of FIG. 2.

As previously described, the communication message storing and delivering device 200 may be configured to further include the message editing restricting means for allowing editing processing of a message stored in the message information storing means (205, 201) in a form restricted for each delivery destination specified by the delivery destination specifying information.

This message editing restricting means can be realized by configuring the access control section 206 to execute a function of restricting a form in which message editing processing is allowed under control of the message storing and delivering control section 201. Types of editing processing and their restrictions in this case are defined by the access list of FIG. 6.

In the communication message storing and delivering device 200 in this configuration, control is performed such that editing processing such as deletion, revision of a content or the like is allowed with respect to an stored message within authority restricted for each delivery destination (for each recipient). As shown, this access list includes not only information about editing but also information which indicates whether access is allowed or not.

(Operation Sequence)

Figure 7:
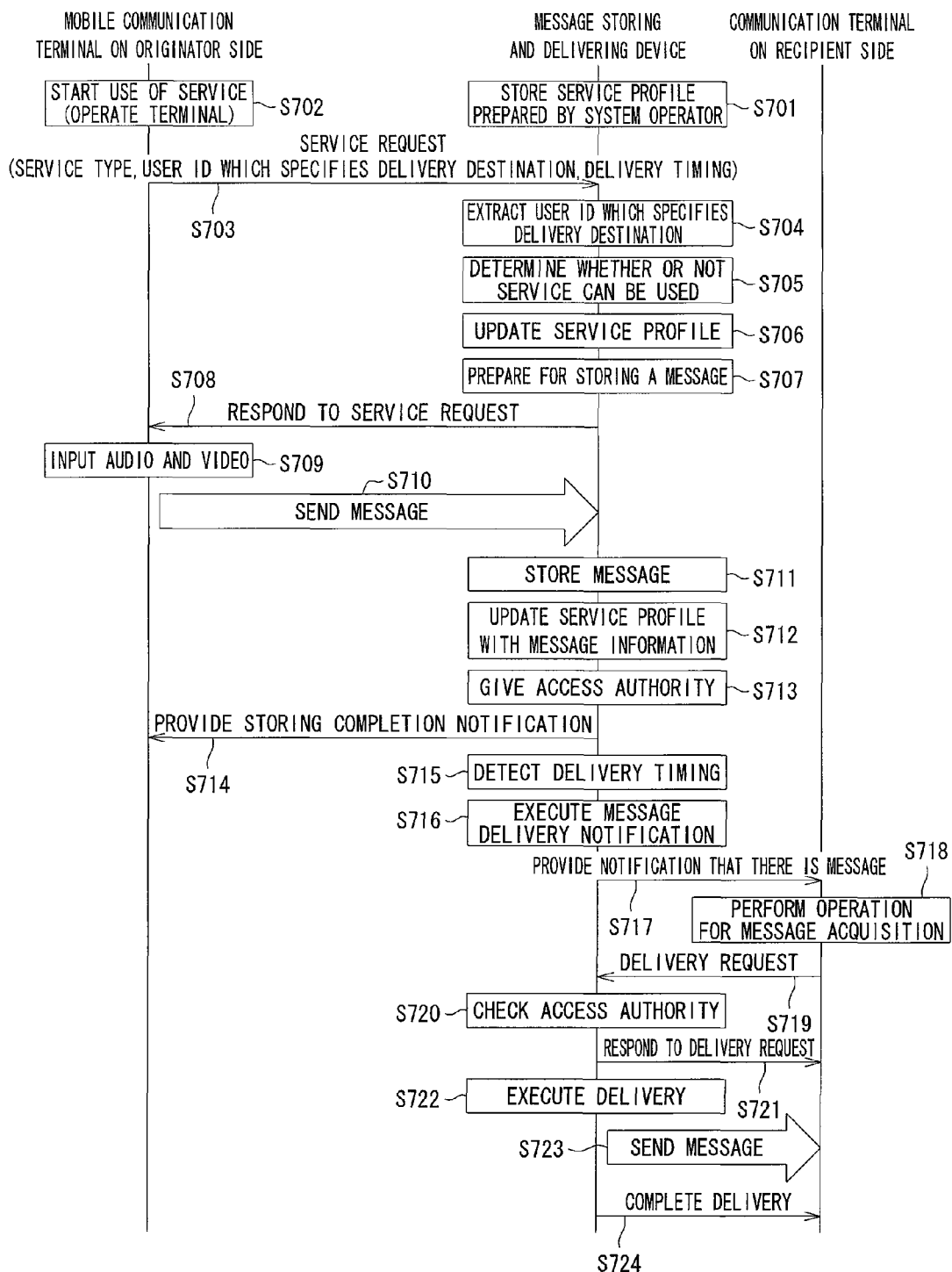
FIG. 7 illustrates a sequence diagram showing operation of a mobile communication terminal device and a communication message storing and delivering device according to one embodiment of the present invention.

FIG. 7 illustrates a sequence diagram of operation of the mobile communication terminal device and communication message storing and delivering device according to one aspect of the present invention. In this sequence diagram, to explain the time-series operation simply, manipulation of a system operator will be mentioned for convenience sake in addition to operation of the device itself.

By operating the message storing and delivering device (200), a system administrator prepares data of originator's storing and delivering service profile as described above with reference to FIG. 4 in the service profile management section 204 (step S701).

A service request is inputted by an operation on the mobile communication terminal device (110=300) on an originator side (step S702).

Data inputted in step S702 representing a type of service, a target user ID which specifies a delivery destination, and a delivery timing such as a date and time is sent to the communication message storing and delivering device (200) ahead of a message itself to be transmitted (delivered) (step S703).

In the communication message storing and delivering device (200), the target user ID which specifies the delivery destination is extracted based on the data received in step S703 (step S704), and whether or not the specified service can be used is determined with reference to the originator's storing and delivering service profile data (FIG. 4) of the service profile management section 204 (step S705).

Further, in the communication message storing and delivering device (200), the originator's storing and delivering service profile of the service profile management section 204 is updated with data representing the user ID and the delivery timing such as date and time among the data supplied in step S703 from the mobile communication terminal device (step S706).

After the processing at the service profile management section 204 in step S706, in the communication message storing and delivering device (200), operation of preparation for storing a message is performed including requesting the originator's message storing section 205 to reserve resources for storing the message (step S707).

When the operation of step S707 is completed, a response to the service request is sent back from the communication message storing and delivering device (200) to the mobile communication terminal device (300: the signal transmitting and receiving section 305) (step S708).

Upon receiving the response in step S708, the mobile communication terminal device (300) displays to the effect that the response is received on the display to prompt the user to send a message. When in response to this prompt, the user inputs a message as a media signal through the terminal operation input section 303 and the audio input-output and video input section 304 (step S709), the inputted media signal (message) is transmitted to the communication message storing and delivering device (200: the signal transmitting and receiving section 203) (step S710).

Upon receiving the message transmitted in step S710, the communication message storing and delivering device (200) stores the message in the originator's message storing section 205 (step S711).

In the communication message storing and delivering device (200), when completion of the storing in step S711 is recognized by the service profile management section 204, the service profile management section 204 extracts property information of the message storing of which is recognized, and updates the originator's storing and delivering service profile with the extracted property information (step S712).

The property information reflected in the originator's storing and delivering service profile in step S712 includes a finish time of message storing, a message length, normal and quasi-normal, and so on.

After the update in step S712, the communication message storing and delivering device (200) communicates the user ID indicating the user of the delivery destination allowed to access the stored message to its own access control section 206, and the access control section 206 which receives the user ID updates the access list with this ID (step S713).

After step S713, the communication message storing and delivering device (200: the signal transmitting and receiving section 203) sends back a storing completion notification to the mobile communication terminal device 300 (step S714).

The operation for transmission on the message originator side performed at the mobile communication terminal device 300 is finished by step S714.

The service profile management section 204 of the communication message storing and delivering device (200) requests its own message storing and delivering control section 201 to start delivery based on delivery date and time data described in the originator's storing and delivering service profile as well as supplying the user ID indicating the user of the delivery destination thereto.

Upon receiving them, the message storing and delivering control section 201 starts delivery control operation (step S715).

In this step S715, the message storing and delivering control section 201 supplies, to the message delivery notification section 207, information for notifying a mobile communication terminal device which is the delivery destination (in the example of FIG. 1, the mobile communication terminal device 120) that the message has been stored, based on the information received from the service profile management section 204.

Upon receiving it, the message delivery notification section 207 generates information for the SMS device 230 in the mobile communication network to deliver SMS to the mobile communication terminal device of the relevant delivery destination, and supplies the generated information to the message storing and delivering control section 201.

The message storing and delivering control section 201 starts operation of sending the supplied information to the mobile communication terminal device which is the delivery destination through SMS using the SMS device 230 (step S716).

By the operation of step S716, a notification that the message has been stored in the mobile communication terminal device of the delivery destination is provided (step S717).

The mobile communication terminal device which has received the notification of step S711 displays that the message has been stored on the display section 306.

The user recognizes this display and then performs an operation on the terminal operation input section 303 of the mobile communication terminal device, and based on this operation, operation to make connection to the communication message storing and delivering device (that is, requesting for delivery of the stored message) is started (step S718).

The mobile communication terminal device sends a request for delivery of the stored message to the communication message storing and delivering device (200: the signal transmitting and receiving section 203) (step S719).

The message delivery request in step S719 is received by the communication message storing and delivering device (200: the signal transmitting and receiving section 203) and recognized by the message storing and delivering control section 201 of the device 200. The recognized message delivery request is then sent to the access control section 206.

The access control section 206 checks whether or not the relevant mobile communication terminal device is being managed as a qualified delivery target, and if the check is positive, sends back information for allowing access to the message storing and delivering control section 201.

The message storing and delivering control section 201 of the communication message storing and delivering device receives the information for allowing access and checks access authority (step S720).

Then, the message storing and delivering control section 201 returns a response to the delivery request in step S719 to the mobile communication terminal device (step S721).

Then, the message storing and delivering control section 201 gives an instruction to perform message delivery to the message delivering section 208. The message delivering section 208 which receives this instruction then executes delivery of the stored message (step S722).

This delivery is performed such that data is delivered from the signal transmitting and receiving section 203 to the mobile communication terminal device under control of the message delivering section 208 (step S723).

When delivery of all predetermined message data is completed, a notification of delivery completion is sent from the message storing and delivering device to the mobile communication terminal device (step S723).

The present invention is effectively applied to deliver a message in a manner appropriate for a situation where it is desired that a temporarily stored message is delivered on originator's will without through direct communication to a recipient not subscribing to telephone answering service or even a recipient (a delivery destination) in a state where it can immediately perform communication.

While the preferred embodiments of the present invention have been illustrated in detail, it should be apparent that modifications and adaptations to those embodiments may occur to one skilled in the art without departing from the scope of the present invention as set forth in the following claims.

The entire disclosure of Japanese Patent Application No. 2007-323211 filed on Dec. 14, 2007 including specification, claims, drawings, and abstract is incorporated herein by reference in its entirety.

What is claimed is:

1. A communication message storing and delivering device comprising:

information receiving means for receiving a message that is transmitted from a mobile communication terminal device, delivery destination specifying information which specifies a delivery destination of the message, and used service specifying information which specifies a way of handling the message;

used service identifying means for identifying whether or not the used service specifying information received by the information receiving means includes a message storing service request which requests to perform a message storing service that stores the message before the message is acquired by the delivery destination specified by the delivery destination specifying information, and identifying whether or not information of the message storing service request is compliant with a normal service used by a subscriber of the mobile communication terminal device which transmits the message;

message information storing means for storing the message, the delivery destination specifying information, and the used service specifying information when the used service identifying means identifies that the received used service specifying information includes the message storing service request information and the message storing service request information is compliant with the normal used service;

notification means for notifying the relevant delivery destination that the message has been stored, based on the delivery destination specifying information stored in the message information storing means; and information supplying means for enabling the delivery destination which receives the notification from the notification means to acquire the message stored in the message information storing means.

2. The communication message storing and delivering device according to claim 1, wherein the information receiving means receives the message, the delivery destination specifying information, and the used service specifying information at different timings.

3. The communication message storing and delivering device according to claim 1, wherein the information supplying means supplies the message to the delivery destination which has made the request, when a request to acquire the message stored in the message information storing means is received from the delivery destination specified by the delivery destination specifying information without waiting for the notification that the message has been stored from the notification means.

4. The communication message storing and delivering device according to claim 1, wherein the information supplying means streams the message stored in the message information storing means to the relevant delivery destination.

5. The communication message storing and delivering device according to claim 1, wherein the message information storing means is connected to a public message storing area which is accessible from a device other than the delivery destination defined by the delivery destination specifying information, and wherein the information supplying means supplies the message from the public message storing area to the relevant device.

6. The communication message storing and delivering device according to claim 1, further comprising message editing restricting means for allowing editing processing of the message stored in the message information storing means in a form restricted for each delivery destination specified by the delivery destination specifying information.

7. The communication message storing and delivering device according to claim 6, wherein the message editing restricting means allows editing processing of the stored message in a form restricted for each group to which the delivery destination specified by the delivery destination specifying information belongs.

8. The communication message storing and delivering device according to claim 1,
wherein the used service identifying means reads notification timing information if the used service specifying information includes the notification timing information which indicates timing to notify the delivery destination specified by the delivery destination specifying information that the message has been stored, and
wherein the notification means notifies the delivery destination that the message has been stored at a timing to correspond to a result of reading the notification timing information by the used service identifying means.

9. The communication message storing and delivering device according to claim 1,
wherein the information receiving means acquires subscriber information from a subscriber information management device in a mobile communication network, and
wherein the notification means notifies the delivery destination that the message has been stored when it is recognized from the subscribe information of the delivery destination acquired by the information receiving means that the delivery destination is in a communication-enabled state.

10. The communication message storing and delivering device according to claim 1, wherein the notification means provides the notification to the delivery destination of the message specified by the delivery destination specifying information, using SMS (Short Message Service).

11. The communication message storing and delivering device according to claim 1,
wherein the used service identifying means reads specification information if the used service specifying information includes the specification information which indicates a specification about a communication capability of the delivery destination specified by the delivery destination specifying information, and
wherein the information supplying means supplies the message to the delivery destination to correspond to the read specification information.

12. A mobile communication terminal device comprising:
message input means for inputting a message to be transmitted including an audio message;
delivery destination specifying operation means for forming delivery destination specifying information which specifies a delivery destination of the message inputted from the message input means, according to an external operation;
used service specifying operation means for forming used service specifying information which specifies a way of handling the message inputted from the message input means, according to the external operation;
signal transmission means for sending, to a communication message storing and delivering device corresponding to the mobile communication terminal device itself, the message inputted from the message input means, the delivery destination specifying information formed according to the operation on the delivery destination specifying operation means, and the used service specifying information formed according to the operation on the used service specifying operation means;
receiving means for receiving a notification from notification means which notifies the relevant delivery destination that the message has been stored, based on the delivery destination specifying information stored in message information storing means in the communication message storing and delivering device; and stored message acquiring means for acquiring the message stored in the message information storing means in the communication message storing and delivering device in response to the notification received by the receiving means.

13. The mobile communication terminal device according to claim 12, wherein the used service specifying operation means comprises an operation section for forming group identification information which indicates a group, to which the mobile communication terminal device belongs, among groups defined corresponding to a form of authority to perform editing processing on the message stored in the message storing means in the communication message storing and delivering device.

14. The mobile communication terminal device according to claim 12, wherein the used service specifying operation means comprises an operation section for forming notification timing information which specifies a timing that the notification means in the communication message storing and delivering device notifies the delivery destination specified by the delivery destination specifying information that the message has been stored.

15. A communication message storing and delivering method comprising:
receiving a message that is transmitted from a mobile communication terminal device, delivery destination specifying information which specifies a delivery destination of the message, and used service specifying information which specifies a way of handling the message;
identifying whether or not the received used service specifying information includes a message storing service request which requests to perform a message storing service that stores the message before the message is acquired by the delivery destination specified by the delivery destination specifying information, as well as identifying whether or not information of the message storing service request is compliant with a normal service used by a subscriber of the mobile communication terminal device which transmits the message;
storing the message, the delivery destination specifying information, and the used service specifying information when results of the identification are both positive;
notifying the relevant delivery destination that the message has been stored based on the stored delivery destination specifying information; and
enabling the delivery destination which receives the notification to acquire the stored message.

* * * * *